United States Patent Office 3,405,202
Patented Oct. 8, 1968

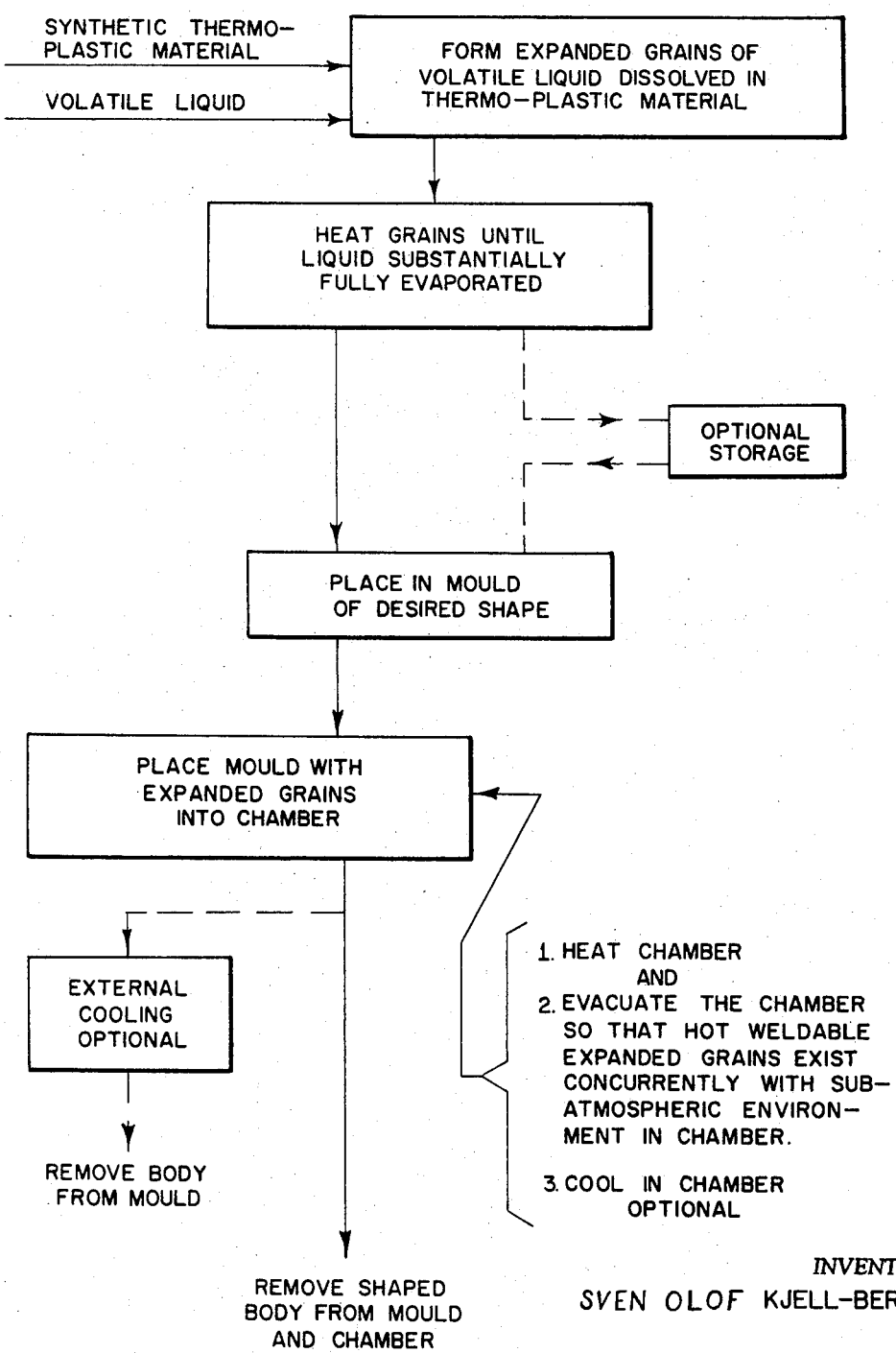

3,405,202
PRODUCTION OF CELLULAR BODIES OF SYNTHETIC THERMOPLASTIC MATERIAL
Sven Olof Kjell Kjell-Berger, Skovde, Sweden, assignor to Skovde Gasbetong Aktiebolag Skovde, Sweden, a corporation of Sweden
Filed Sept. 19, 1963, Ser. No. 310,151
Claims priority, application Sweden, Sept. 25, 1962, 10,267/62
10 Claims. (Cl. 264—53)

This invention relates to the production of cellular synthetic thermoplastic materials.

It has been proposed, heretofore, to produce cellular synthetic plastic materials by adding during or after the polymerization of the plastic, easily evaporable, nonsolvent, swelling, nonpolymerisable liquids, and if the liquid is added during polymerization, to carry through the polymerization procedure at a temperature below the boiling point of the added fluids. The grains of plastic so formed may then be joined to produce porous bodies by heating the plastic to temperatures above the boiling point of the said nonpolymerisable liquid. These bodies may be produced in moulds wherein the vapors from the said liquids existing in the mass are subjected to heat and pressure to provide expansion and uniting of the separate grains of the plastic. A highly cellular body is obtained after cooling the contents of the mould.

One of the more severe disadvantages with the said method, however, is that one cannot produce bodies of a given form and magnitude using open moulds.

Attempts to overcome this disadvantage have been made by preexpanding the polymerised plastic in heat but outside of the moulds, there evaporating only part of the evaporable liquid, and therafter finally expanding the polymerised plastic in closed moulds, thereby heating the contents of the mould to still higher temperatures, which are not only above the boiling point of the volatile liquid contained in the plastic but also above the softening point of the plastic. The plastic may be stored in its preexpanded state, thereby still containing a quantity of the liquid.

However this method also suffers from certain disadvantages. Even though the grains are expanded, the plastic must, at the final expansion necessarily contain a quantity of nonused, that is, not yet evaporated, liquid, because otherwise the required pressure would not be obtained to ensure that the grains of plastic in the final, softened state are pressed together into a coherent body in the closed mould. The treatment of plastic grains by this method is sometimes called mould-welding.

The degree of expansion of the plastic grains is dependent upon the quantity of the volatile liquid, contained by the grains at the final expansion phase. The strength of the body against interior breaking-up depends on the forces, which in the final phase press the different grains into each other during the mould welding. Thus a part of the volatile liquid contained in the plastic which is not essential for the expansion of the grains is used in the final phase of mould welding the plastic body. However these reaction conditions act unfavourably on the possibility of producing by known methods products of low density.

The present invention is based on the discovery that if the grains are allowed to expand to their maximum size by using the low boiling liquid existing in the grains, so that the final mould welding of the expanded grains takes place without the use of expanding forces from this liquid, then products of an essentially lower denisty can be obtained.

In tests based on this concept, it has now been surprisingly proved that the plastic grains need not contain any remaining liquid for expansion at the time of the final phase of mould welding, when the grains are joined into larger units if instead the moulding takes place in a vacuum. In fact, it has been discovered that any remaining liquid may even be a disadvantage.

According to the present invention the cellular bodies of synthetic thermoplastic material are produced using volatile liquids for expansion means. However in the method of the present invention the plastic bodies are allowed to expand until substantially complete use, that is, evaporization, of the liquids for the expansion. The separate grains, thus expanded are joined at a later time under vacuum and heat in a perforated mould.

The expression "substantially complete use" of the liquids for the expansion in this connection means that the use shall take place as far as technically and economically reasonable. It is obvious that due to the balancy laws of solvents a very small remaining quantity of the expansion will always remain in the initial material, but this shall be kept low, and shall not be sufficient to provide any further expansion during the subsequent joining of the separate grains in vacuum and heat because the material will already be "fully expanded" in the preparatory state.

Further details of the invention will be evident from the following detailed specification of a method and the production according to one form of execution of the invention and the attached drawing which is a flow sheet showing the operation of the method of the invention.

The flow sheet illustrates the sequence of the steps of the method. The steps themselves will now be explained in detail.

The plastic grains have added thereto, either during or after polymerisation, the volatile liquid with a low boiling point and/or low heat of evaporation. Thereafter the separate grains are caused by heating in the free state to expand to such a state that all or at least substantially all of the volatile liquid has been used up to expand the plastic grains to the desired, for instance maximum, size. The grains expanded in this way are thereafter cooled, or allowed to cool by themselves, to a temperature suitable for storing, at which they may remain during a long period of time, if required. When the grains, which now have the form of approximately ball-formed bodies, are used for forming a cellular plastic body, a quantity of the grains, corresponding to the intended weight of said body, is put into a closable mould. The quantity of the grains in this way also determines the density of the body to be formed. The mould is perforated in a plurality of places, preferably in such a way that when an external difference of pressure is applied to the mould, this difference of pressure is quickly distributed to the interior of the mould. Of course, the perforation holes should not be so big that the expanded plastic balls may escape through them. This mould is thereafter introduced into a closable, vacuum tight chamber, which may be made in any suitable way. If desired the chamber may be large enough to accommodate a greater number of moulds simultaneously. The chamber is put in connection with a vacuum conduit and a conduit for a hot gas, for example, air or steam.

The conduit between said chamber and the vacuum pump is first opened so that a progressively increased vacuum is created within the chamber, and due to the perforations of the mould, also in the mould. The plastic balls, however, are still being rather loosely packed. After obtaining the desired strength of the vacuum, depending upon the desired properties of the plastic body, the vacuum conduit is closed, simultaneously as the hot gas conduit is opened to introduce hot gas, preferably steam, although hot air or other hot gases may be used. The pressure and temperature within the chamber then rapidly increases, increasing the temperature of the plastic balls both quickly and uniformly.

It may be desirable not to carry the evacuation to its practical completion so that a given quantity of air is still left in the chamber to exist between the separate plastic grains. Thus, the condition within the chamber will be referred to as being at "subatmosphere pressure." This air may cause the temperature to rise during the subsequent heat treatment essentially quicker in the outer layer of the body being formed, and this may add to better form stability. The temperature of the fed hot gas or steam should be chosen to cause a weakening of the plastic grains so that they start to be welded together by the heat after they have been further expanded due to the vacuum force. Thereby the admission of steam or hot air to the innermost parts of the body to be formed is made more difficult, so that these parts rise in temperature at a slower rate than the outside.

When the temperature in the mold has reached the desired value, so that the plastic grains have arrived at a substantially uniform temperature at which all of the mass has achieved a weakening temperature and a weldable state. Then, if the quantity of the hot gas introduced has been sufficient to eliminate the subatmospheric conditions, so that the hot grains did not exist concurrently with the subatmospheric conditions, then the feeding of further steam or hot gas is interrupted, and the chamber is reconnected to the vacuum conduit. When the hot weldable plastic grains do exist concurrently with the subatmospheric pressure steam or air received by the hot plastic grains, then the grains expand under the influence of the outer vacuum formation, so that the walls of the plastic bodies are effectively pressed together, and the welding is completed to give the body a very high strength. Simultaneously the plastic grains are further increased in volume, so that they "grow" into each other.

After the welding has been completed, a cooling medium, for instance cooling water, may be conducted into the chamber, preferably at its bottom. The cooling water slowly rises to fill all of the mould. During the entry of the cooling medium the mould is still kept under a weak but controllable vacuum.

Thus, it should be noted that the expansion welding step takes place in heat and in an evacuated state; that is, during the entire expansion/welding step in the chamber there is a lower pressure in the mould and chamber than in the surruonding air. At all earlier usual methods for accomplishing a welding by expanding a plastic, the plastic has been pressed in hot air, steam or the like under pressure, so that the expansion welding procedure took place under a pressure, which is higher than that of the surrounding air.

A welded body of predetermined size is obtained by the method of the present invention since the body completely fills out the mould and is completely form-stable, disregarding the natural change of form, which will of course exist in all such cases when an elastically deformable plastic is used.

When using the method according to this invention, welded bodies may be obtained having a density which is essentially lower than anything which could be achieved according to the known methods. For instance, there is no difficulty in obtaining welded bodies, which are completely correct and stable as to their form, although their density is only 5–10 kg./m.$^3$. Also there is no difficulty in determining the density. It is only necessary to note the quantity of plastic which was initially put into the mould.

The method according to the invention also has other advantages; in the first place the moulds are very simple and cheap to manufacture. In the older methods, one had to require a pressure-safe mould for each separate object, into which one could feed gas or steam under pressure. Such moulds are expensive to manufacture, and they have a limited useful life. According to the invention the mould should be perforated, and such a mould for self-evident reasons, is much simpler to make. Also, the perforated moulds can be made of thinner material because it is hardly subjected to any external force. Vacuum or existing pressure are fully received by the walls of the chamber, but the chamber does not require any specific strengthening.

A single chamber may be used for different sizes and shapes of moulds, each for forming a different welded body. The chamber can be made large enough to receive a great number of moulds simultaneously.

A further advantage of the present invention is that the bodies may be formed if desired in a single mould, and this mould may be placed in a single chamber. Thus it is possible to make the method automatic avoiding delays in time and reducing to a minimum the required servicing of the equipment.

Although the method of the invention has been described with considerable detail with respect to a preferred operation thereof, it should be evident that variations and modifications are possible within the spirit and scope of the invention.

What I claim is:

1. A method for the production of cellular bodies of synthetic thermoplastic material from grains of said material having a volatile liquid added thereto comprising the steps of:
    (1) expanding the said grains until substantially complete evaporation of the said liquid, and
    (2) subsequently welding the expanded grains together by heating the expanded grains to an elevated temperature at which they are capable of being plastic welded together, and evacuating the chamber to create a sub-atmospheric pressure in the chamber, wherein the said sub-atmospheric pressure and the said elevated temperature exist in the chamber concurrently.

2. A method according to claim 1 including the step of storing the expanded grains before performing the said welding step.

3. A method according to claim 2 wherein the said welding step comprises the steps of:
    (a) placing a quantity of said expanded grains, corresponding to the density of the porous body to be formed, into a perforated mold,
    (b) placing the said mold into a chamber,
    (c) creating a subatmospheric pressure in said chamber, and then
    (d) heating the mold and plastic grains within said chamber to a temperature sufficient to cause the said plastic grains to form a plastic weld therebetween while maintaining the chamber at subatmospheric pressure.

4. A method according to claim 3 wherein said heating step is accomplished by introducing into the chamber a hot gas.

5. A method according to claim 4 including the step of cooling the said mold and cellular body by introducing a cooling medium into the chamber.

6. A method according to claim 5 wherein said cooling medium is water.

7. A method according to claim 6 in which the water is fed into the chamber while the chamber is still at a subatmospheric pressure.

8. A method according to claim 4 including the step of further evacuating the said chamber after the said hot gas has been introduced.

9. A method according to claim 8 including the step of cooling the said mold and cellular body by introducing a cooling medium into the chamber.

10. A method according to claim 9 wherein said cooling medium is water.

References Cited

UNITED STATES PATENTS

| | | | |
|---|---|---|---|
| 2,787,809 | 4/1957 | Stastny | 264—53 |
| 2,907,072 | 10/1959 | Jodell | 264—52 |
| 3,015,851 | 1/1962 | Wiles | 264—53 |
| 3,029,472 | 4/1962 | Fischer | 264—52 |
| 3,058,162 | 10/1962 | Grabowski | 264—53 |
| 3,080,612 | 3/1963 | Buchmann | 254—51 |
| 3,159,694 | 12/1964 | Wiles et al. | 264—53 |
| 3,255,286 | 6/1966 | Luc-Belmont | 264—109 |

FOREIGN PATENTS 623,804  7/1961  Canada.

ALEXANDER H. BRODMERKEL, *Primary Examiner.*

P. E. ANDERSON, *Assistant Examiner.*